US011520998B2

(12) United States Patent
Bradbury

(10) Patent No.: US 11,520,998 B2
(45) Date of Patent: *Dec. 6, 2022

(54) NEURAL MACHINE TRANSLATION WITH LATENT TREE ATTENTION

(71) Applicant: salesforce.com, inc., San Francisco, CA (US)

(72) Inventor: James Bradbury, Mountain View, CA (US)

(73) Assignee: Salesforce.com, Inc., San Francisco, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 16/709,330

(22) Filed: Dec. 10, 2019

(65) Prior Publication Data

US 2020/0117861 A1    Apr. 16, 2020

Related U.S. Application Data

(63) Continuation of application No. 15/901,722, filed on Feb. 21, 2018, now Pat. No. 10,565,318.

(60) Provisional application No. 62/485,856, filed on Apr. 14, 2017.

(51) Int. Cl.
| G06F 40/58 | (2020.01) |
| G06F 40/284 | (2020.01) |
| G06N 3/08 | (2006.01) |
| G06N 3/04 | (2006.01) |
| G06N 5/00 | (2006.01) |
| G06F 40/44 | (2020.01) |
| G06F 40/211 | (2020.01) |
| G06F 40/216 | (2020.01) |

(52) U.S. Cl.
CPC .......... *G06F 40/58* (2020.01); *G06F 40/211* (2020.01); *G06F 40/216* (2020.01); *G06F 40/284* (2020.01); *G06F 40/44* (2020.01); *G06N 3/0445* (2013.01); *G06N 3/0454* (2013.01); *G06N 3/08* (2013.01); *G06N 5/003* (2013.01)

(58) Field of Classification Search
CPC .... G06F 40/284; G06F 40/216; G06F 40/211; G06F 40/58; G06F 40/44
See application file for complete search history.

(56) References Cited

U.S. PATENT DOCUMENTS

| 10,282,663 B2 | 5/2019 | Socher et al. |
| 10,346,721 B2 | 7/2019 | Albright et al. |
| 2016/0350653 A1 | 12/2016 | Socher et al. |
| 2017/0024645 A1 | 1/2017 | Socher et al. |
| 2017/0032280 A1 | 2/2017 | Socher |
| 2017/0140240 A1 | 5/2017 | Socher et al. |
| 2018/0082171 A1 | 3/2018 | Merity et al. |
| 2018/0096219 A1 | 4/2018 | Socher |

(Continued)

OTHER PUBLICATIONS

Akiko Eriguchi, Learning to Parse and Translate Improves Neural Machine Translation, Feb. 12, 2017 (Year: 2017).*

(Continued)

*Primary Examiner* — Thomas H Maung
(74) *Attorney, Agent, or Firm* — Haynes and Boone LLP

(57) ABSTRACT

An attentional neural machine translation model is provided for the task of machine translation that, according to some embodiments, leverages the hierarchical structure of language to perform natural language processing without a priori annotation. Other features are also provided.

21 Claims, 9 Drawing Sheets

(56) References Cited

U.S. PATENT DOCUMENTS

| | | |
|---|---|---|
| 2018/0096267 A1 | 4/2018 | Masekara et al. |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0300400 A1 | 10/2018 | Paulus |
| 2018/0336198 A1 | 11/2018 | Zhong et al. |
| 2019/0108432 A1 | 4/2019 | Lu et al. |
| 2019/0108439 A1 | 4/2019 | Lu et al. |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |

OTHER PUBLICATIONS

Chris Dyer et al., Recurrent Neural Network Grammars, Oct. 12, 2016 (Year: 2016).*

Bowman et al., "A Fast Unified Model for Parsing and Sentence Understanding," Association for Computational Linguistics, Berlin, Germany. Aug. 7-12, 2016. pp. 1-11.

Bradbury et al., "Towards Neural Machine Translation with Latent Tree Attention," Proceedings of the 2nd Workshop on Structured Prediction for Natural Language Processing, Copenhagen, Denmark. Sep. 7-11, 2017. pp. 1-6.

Chiang et al., "A Hierarchical Phrase-Based Model for Statistical Machine Translation," The Association for Computational Linguistics, 43rd Annual Meeting, University of Michigan, Ann Arbor. Jun. 25-30, 2005. pp. 1-8.

Chung et al., "Hierarchical Multiscale Recurrent Neural Networks," 5th International Conference on Learning Representations, Palais des Congrès Neptune, Toulon, France. Apr. 24-26, 2017. pp. 1-13.

Dyer et al., "Recurrent Neural Network Grammars," The 15th Annual Conference of the North American Chapter of the Association for Computational Linguistics: Human Language Technologies, San Diego, California. Jun. 12-17, 2016. pp. 1-13.

Dyer et al., "Transition-based Dependency Parsing with Stack Long Short-term Memory," Conference on Empirical Methods in Natural Language Processing, Austin, Texas. Nov. 1-5, 2016. pp. 1-10.

Eriguchi et al., "Learning to Parse and Translate Improves Neural Machine Translation," 55th Annual Meeting of the Association for Computational Linguistics, Vancouver, Canada. Jul. 30-Aug. 4, 2017. pp. 1-7.

Eriguchi et al., "Tree-to-sequence Attentional Neural Machine Translation," Association for Computational Linguistics, Berlin, Germany. Aug. 7-12, 2016. pp. 11.

Goller et al., "Learning Task-dependent Distributed Representations by Back-propagation Through Structure," In IEEE International Conference on Neural Networks, vol. 1. Washington D.C. Jun. 3-6, 1996. pp. 1-14.

Hashimoto et al., "Neural Machine Translation with Source-Side Latent Graph Parsing," 2017 Conference on Empirical Methods in Natural Language Processing, Copenhagen, Denmark. Sep. 7-11, 2017. pp. 1-11.

Huang et al., "A Syntax-directed Translator with Extended Domain of Locality," Proceedings of the 21st International Conference on computational Linguistics and 44th Annual Meeting of the Association for Computational Linguistics, Sydney, Australia. Jul. 20, 2006. pp. 1-8.

Kim et al., "Structured Attention Networks," Published as a Conference Paper at the International Conference on Learning Representation, Palais des Congrès Neptune, Toulon, France. Apr. 24-26, 2017. pp. 1-21.

Kingma et al., "ADAM: A Method for Stochastic Optimization," Conference Paper at the International Conference on Learning Representation, San Diego, CA. May 7-9, 2015. pp. 1-15.

Klein et al., "OpenNMT: Open-Source Toolkit for Neural Machine Translation," Association for Computational Linguistics, Vancouver, Canada. Jul. 28, 2017. https://aclanthology.info/papers/P17-4012/p17-4012. pp. 1-6.

Kuncoro et al., "What Do Recurrent Neural Network Grammars Learn About Syntax?," European Chapter of the Association for Computational Linguistics, Valencia, Spain. Apr. 3-7, 2017. pp. 1-10.

Li, "Deep Reinforcement Learning: An Overview," Proceedings of SAI Intelligent Systems Conference (IntelliSys), London, UK. Sep. 21-22, 2016. pp. 1-70.

Luong et al., "Effective Approaches to Attention-based Neural Machine Translation," Conference on Empirical Methods in Natural Language Processing, Lisbon, Portugal. Sep. 17-21, 2015. pp. 1-11.

Nadejde et al., "Syntax-aware Neural Machine Translation Using CCG," Second Conference on Machine Translation (WMT17). Copenhagen, Denmark. Sep. 7-8, 2017. pp. 1-13.

Pollack "Recursive Distributed Representations," Artificial Intelligence vol. 46, No. 1, pp. 1-32.

Schulman et al., "Gradient Estimation Using Stochastic Computation Graphs," Advances in Neural Information Processing Systems, Motreal, Canada. Dec. 7-12, 2015. pp. 1-9.

Sennerich et al., "Linguistic Input Features Improve Neural Machine Translation," Association for Computational Linguistics—First Conference on Machine Translation (WMT16), Berlin, Germany. Aug. 11-12, 2016. pp. 1-9.

Socher et al., "Learning Continuous Phrase Representations and Syntactic Parsing with Recursive Neural Networks," Advances in Neural Information Processing: Workshop on Deep Lerning and Unsupervised Feature Learning, Vancouver, Canada. Dec. 6-11, 2010. pp. 1-9.

Socher et al., "Recursive Deep Models for Semantic CompositionalityOver a Sentiment Treebank," Conference on Empirical Methods in Natural Language Processing, Seattle, USA. Oct. 18-21, 2013. pp. 1-12.

Specia et al., "A Shared Task on Multimodal Machine Translation and Crosslingual Image Description," First Conference on Machine Translation, vol. 2: Shared Task Papers. Berlin, Germany. Aug. 11-12, 2016. pp. 1-11.

Wang et al., "Survey on the Attention Based RNN Model and Its Applications in Computer Vision," arXiv:1601.06823. https://arxiv.org/pdf/1601.06823.pdf. Jan. 25, 2016. pp. 1-42.

Wu, "Stochastic Inversion Transduction Grammers and Bilingual Parsing of Parallel Corpora," Association for Computational Linguistics, vol. 23, No. 3. Madrid, Spain. Jul. 7-12, 1997. pp. 1-28.

Yogatama et al., "Learning to Compose Words Into Sentences With Reinforcement Learning," Submitted and Accepted at the International Conference on Learning Representation. Palais des Congrès Neptune, Toulon, France. Apr. 24-26, 2017. pp. 1-10.

Eriguchi, "Learning to Parse and Translate Improves Neural Machine Translation," arXiv: 1702.03525v2, 2017.

Luong, Effective Approaches to Attention-Based Neural Machine Translation, arXiv: 1508.04025v5, 2015.

Socher et al., "CS 224D: Deep Learning for NLP, Lecture Notes: Part I, Part II, Part III, Part IV, Part V" Stanford University, 2016.

* cited by examiner

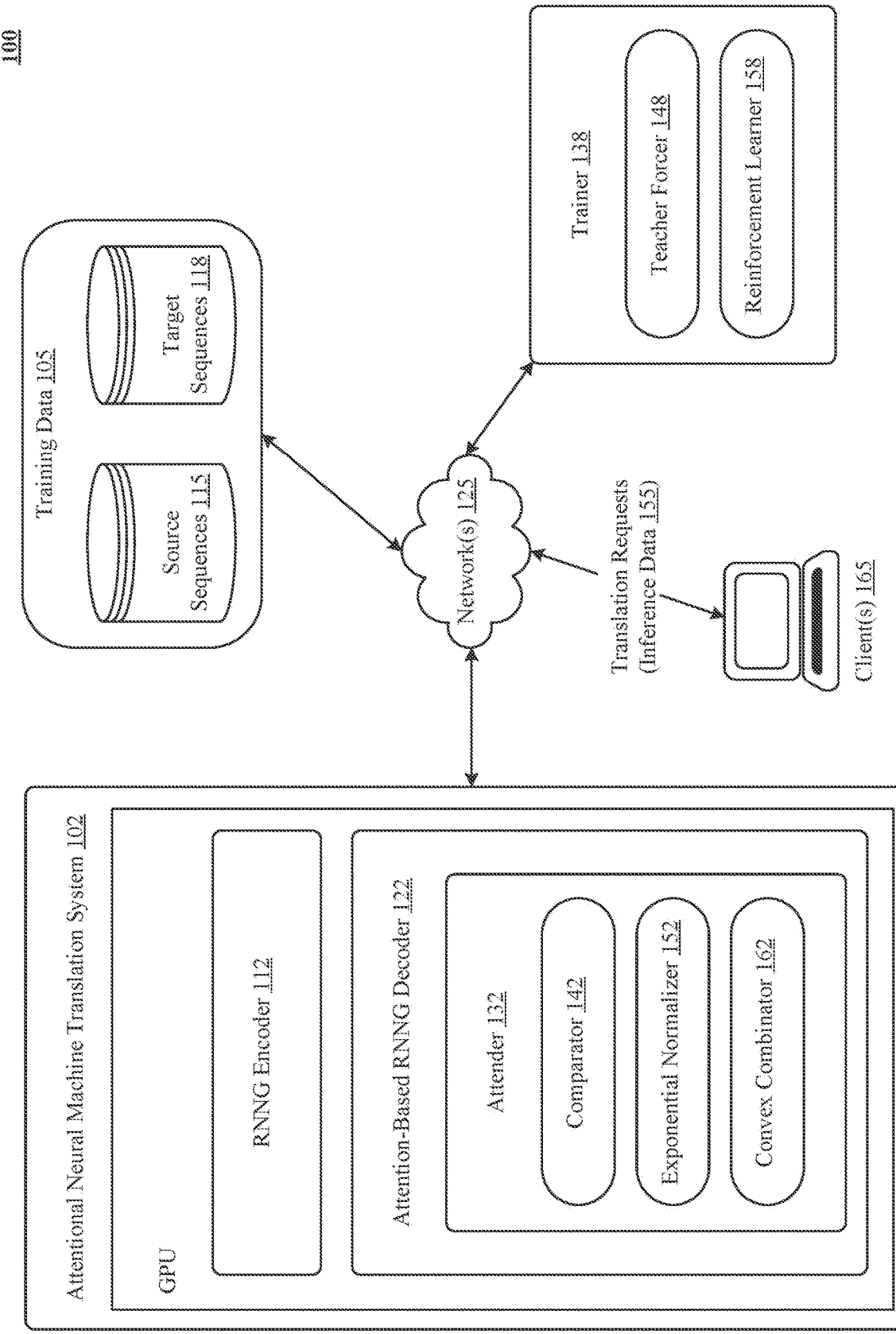
FIG. 1 – Environment

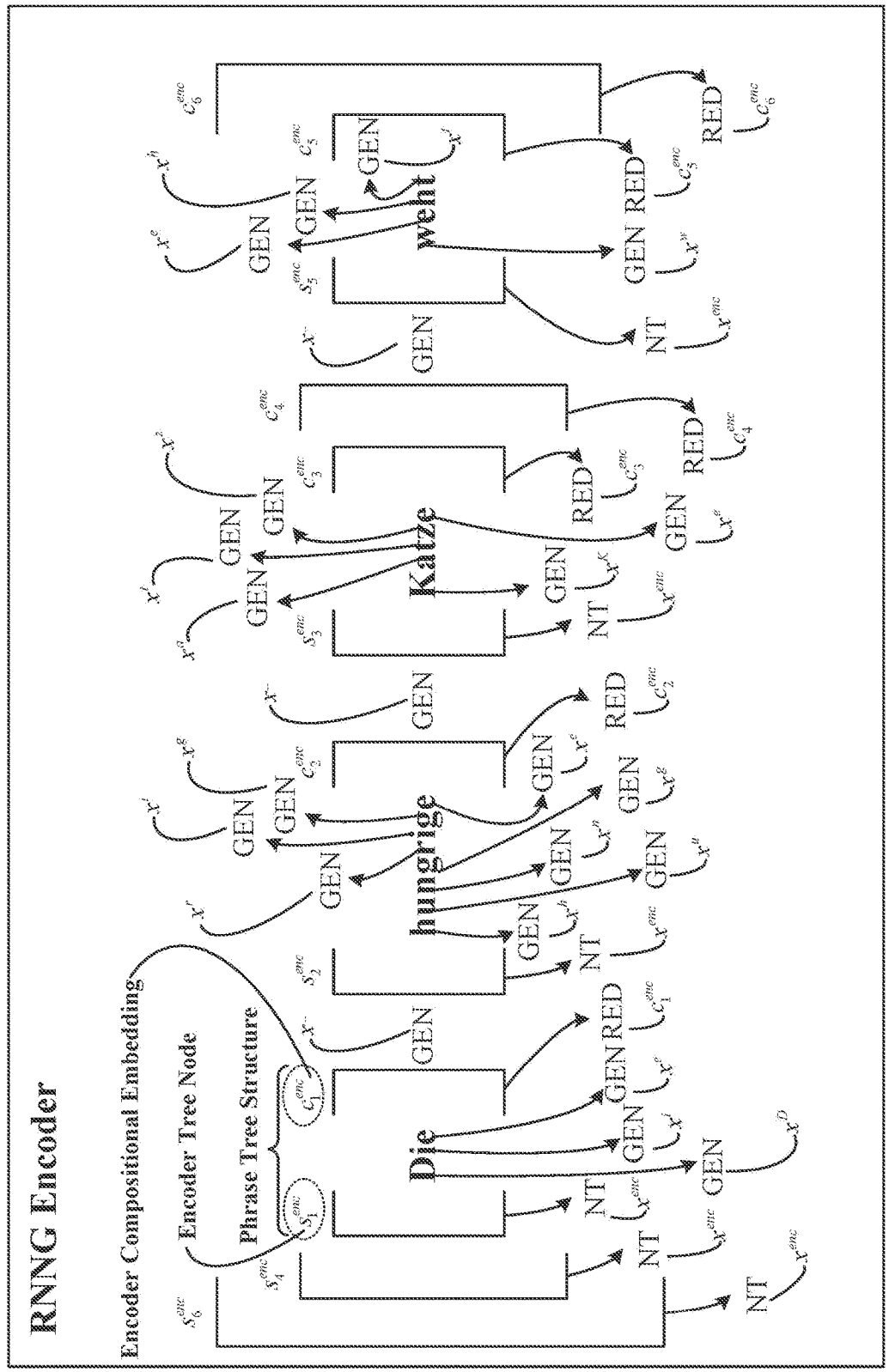
FIG. 2 – Source Sequence Consumption

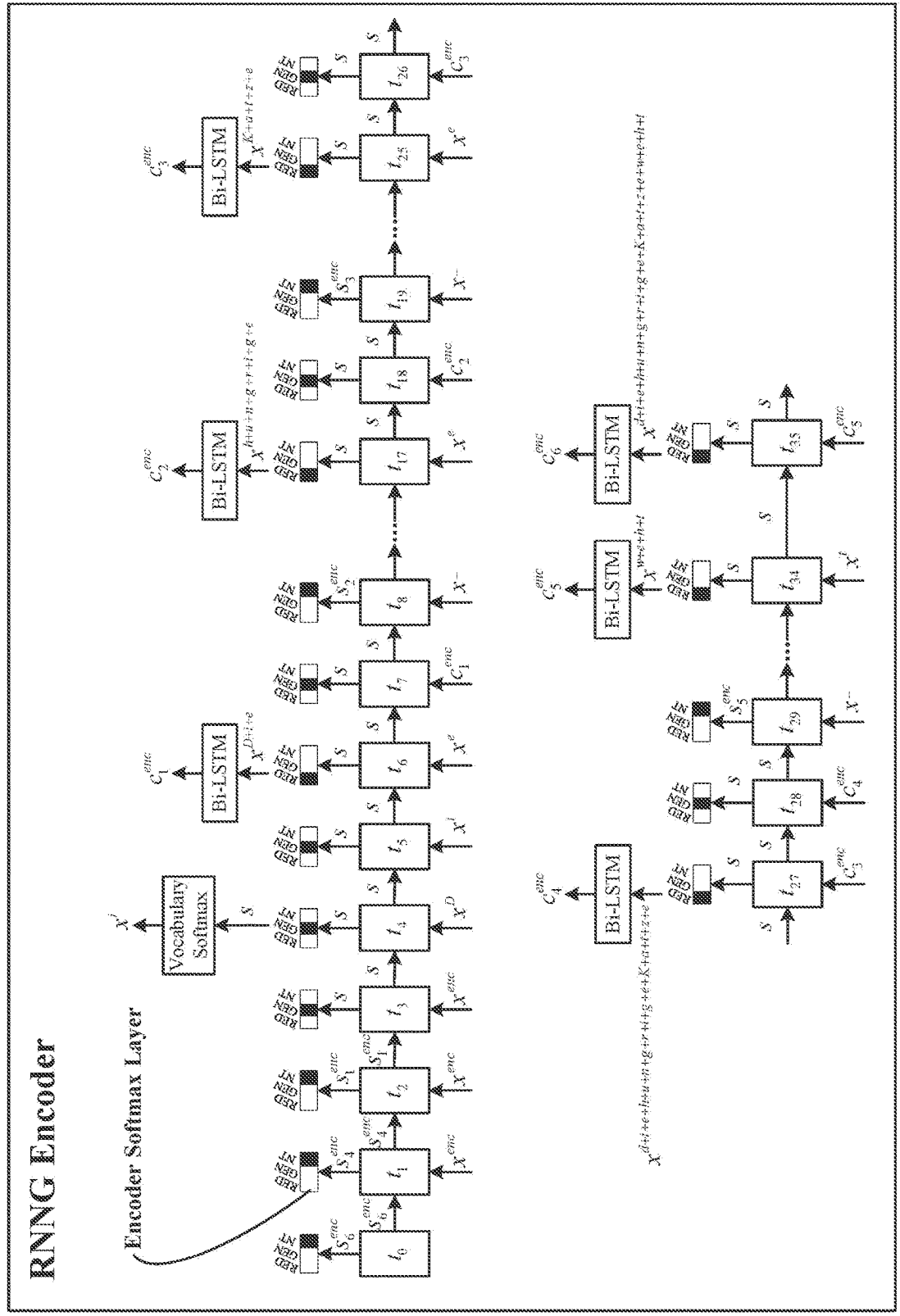

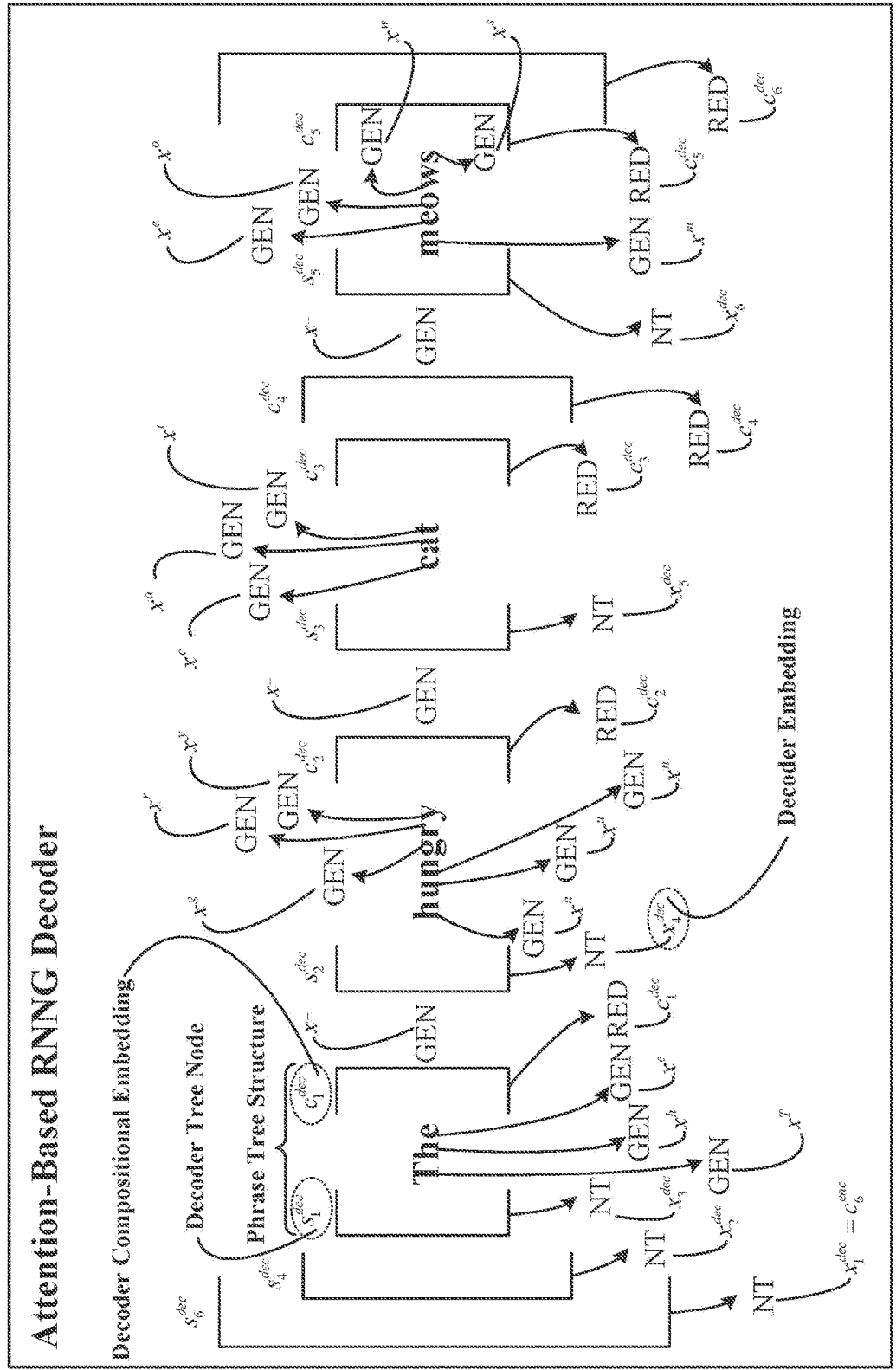
FIG. 4 – Target Sequence Emittance

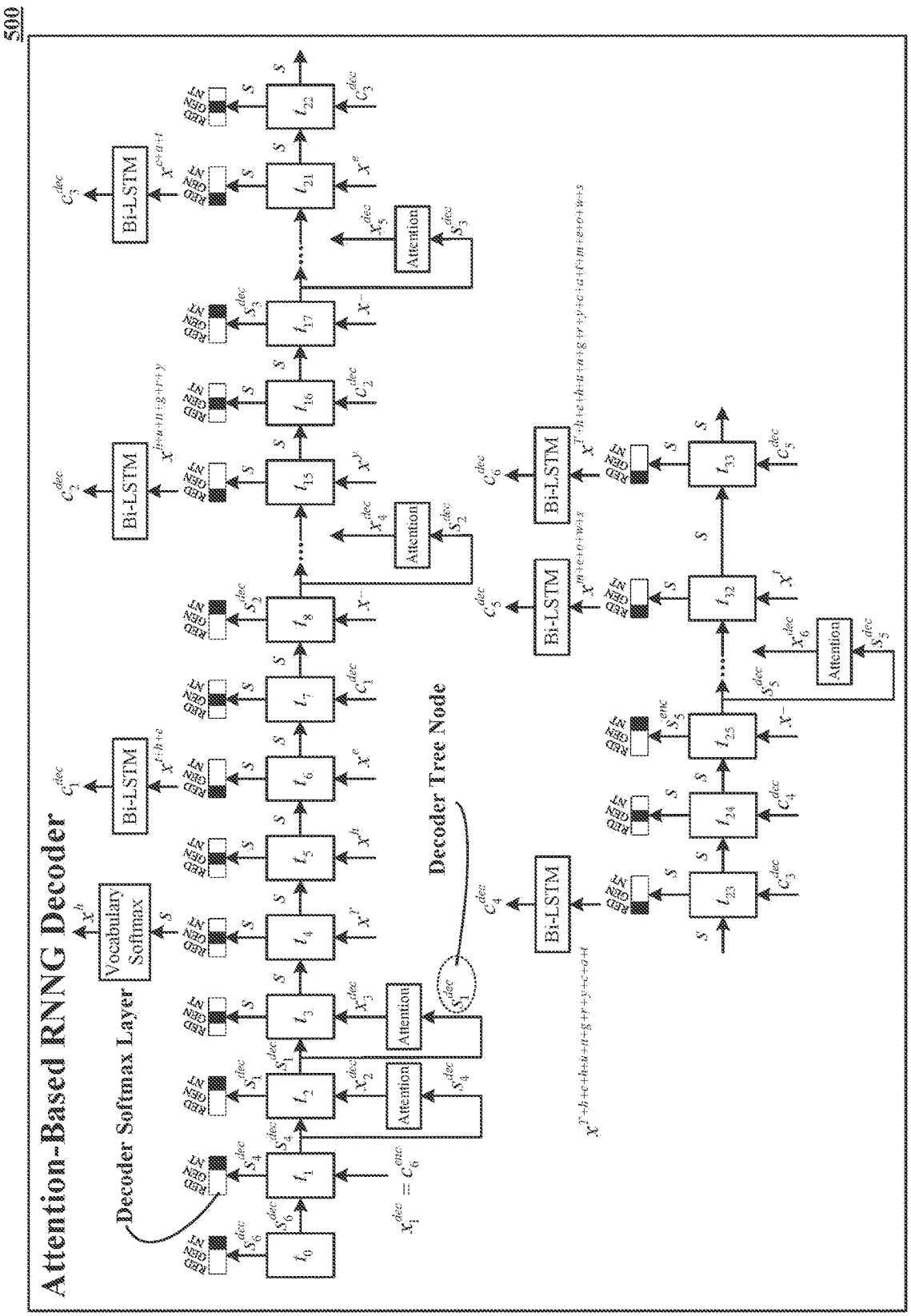
FIG. 5 – Attention-Based Decoder Processing

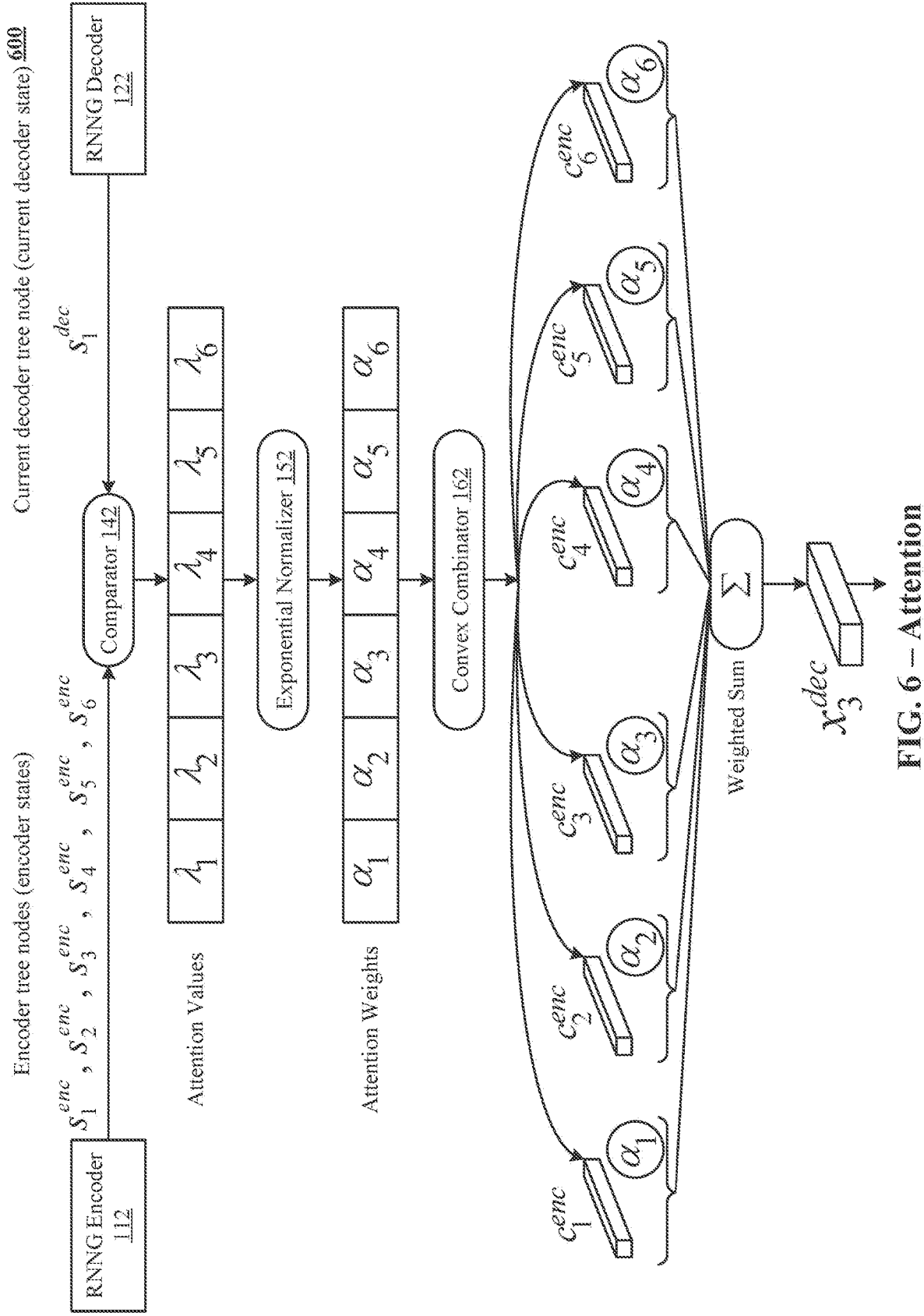
FIG. 6 – Attention

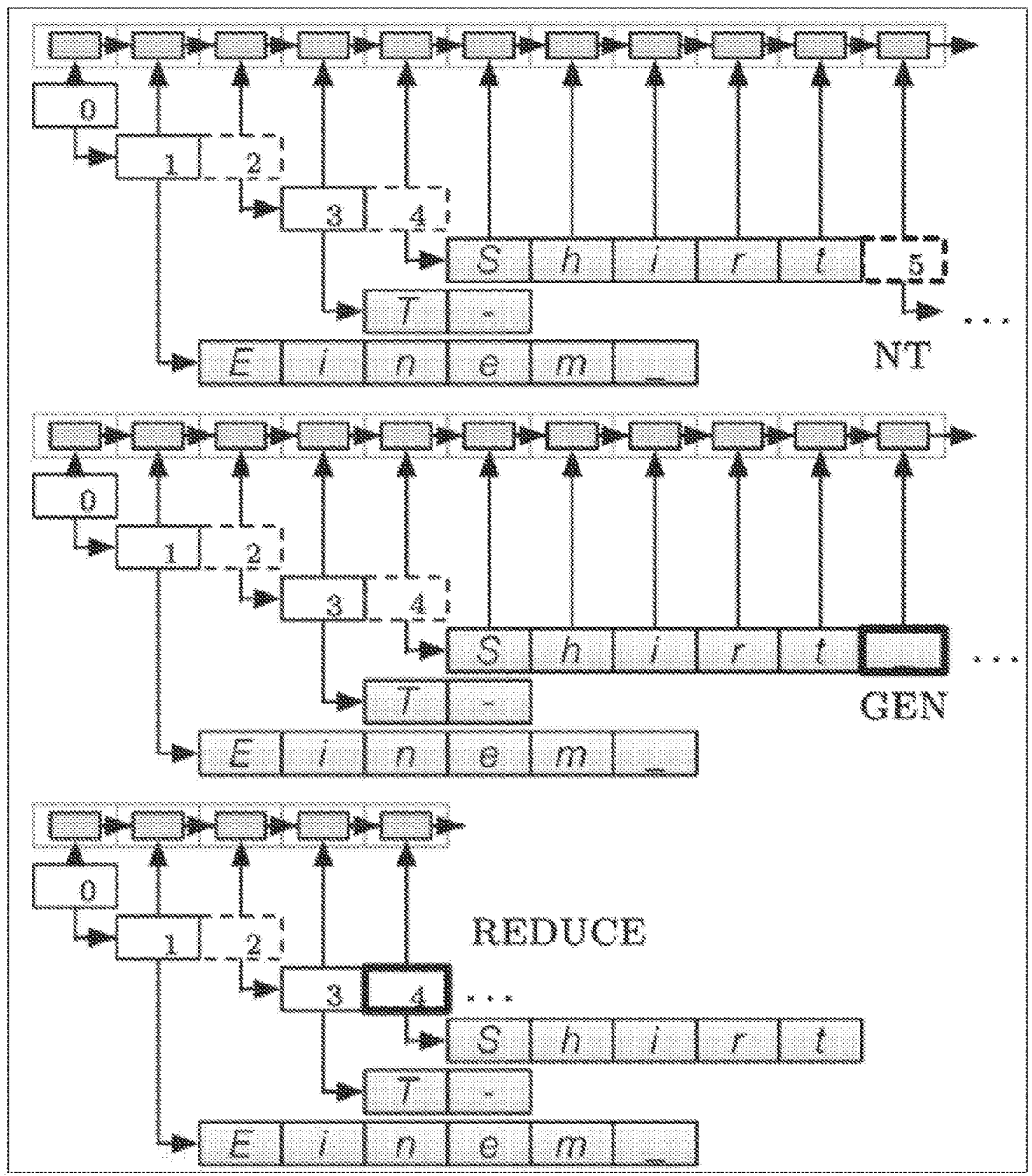
FIG. 7 – Attention-Based Phrase Structure Parsing

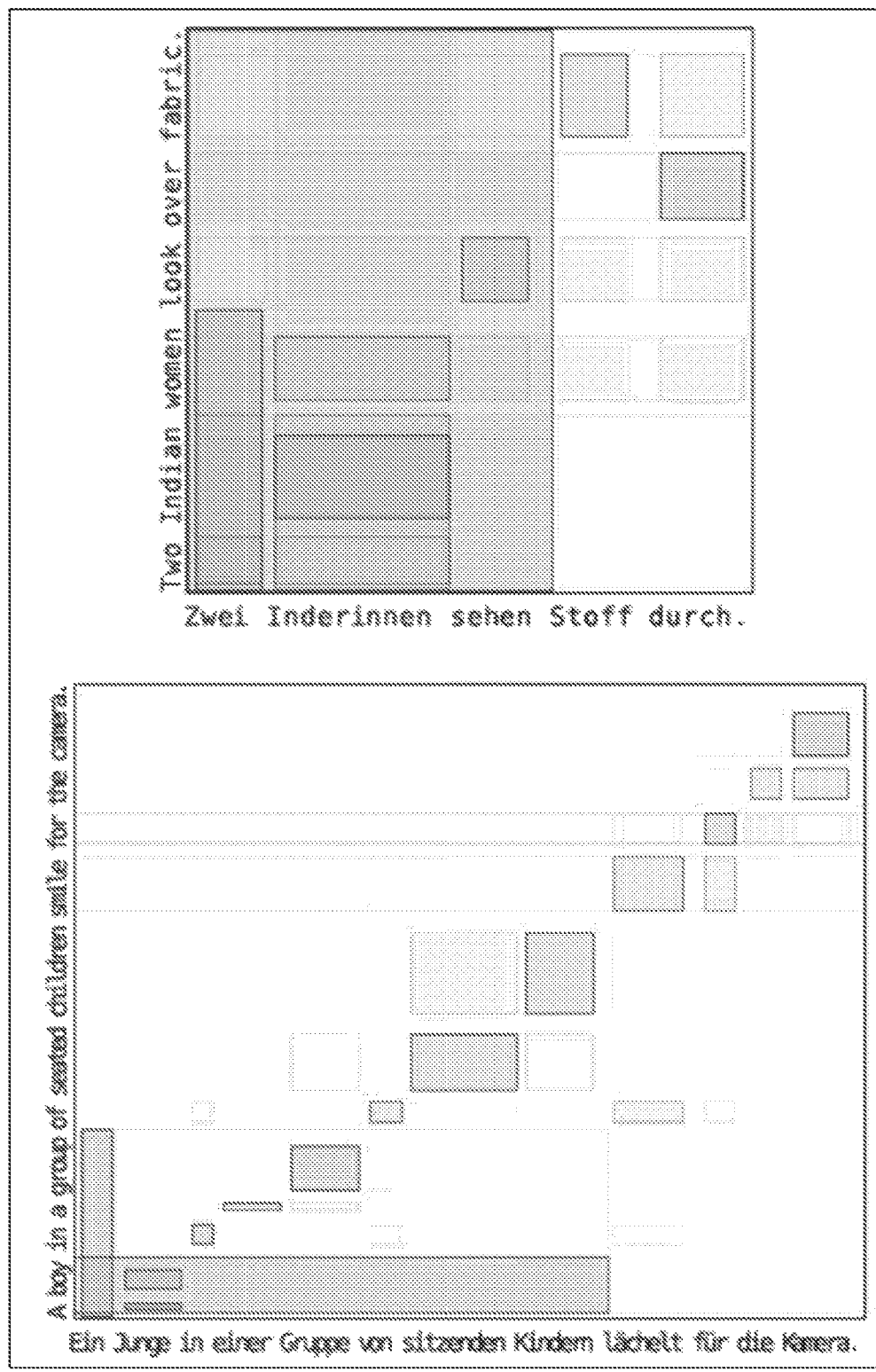
FIG. 8 – Attention Visualizations

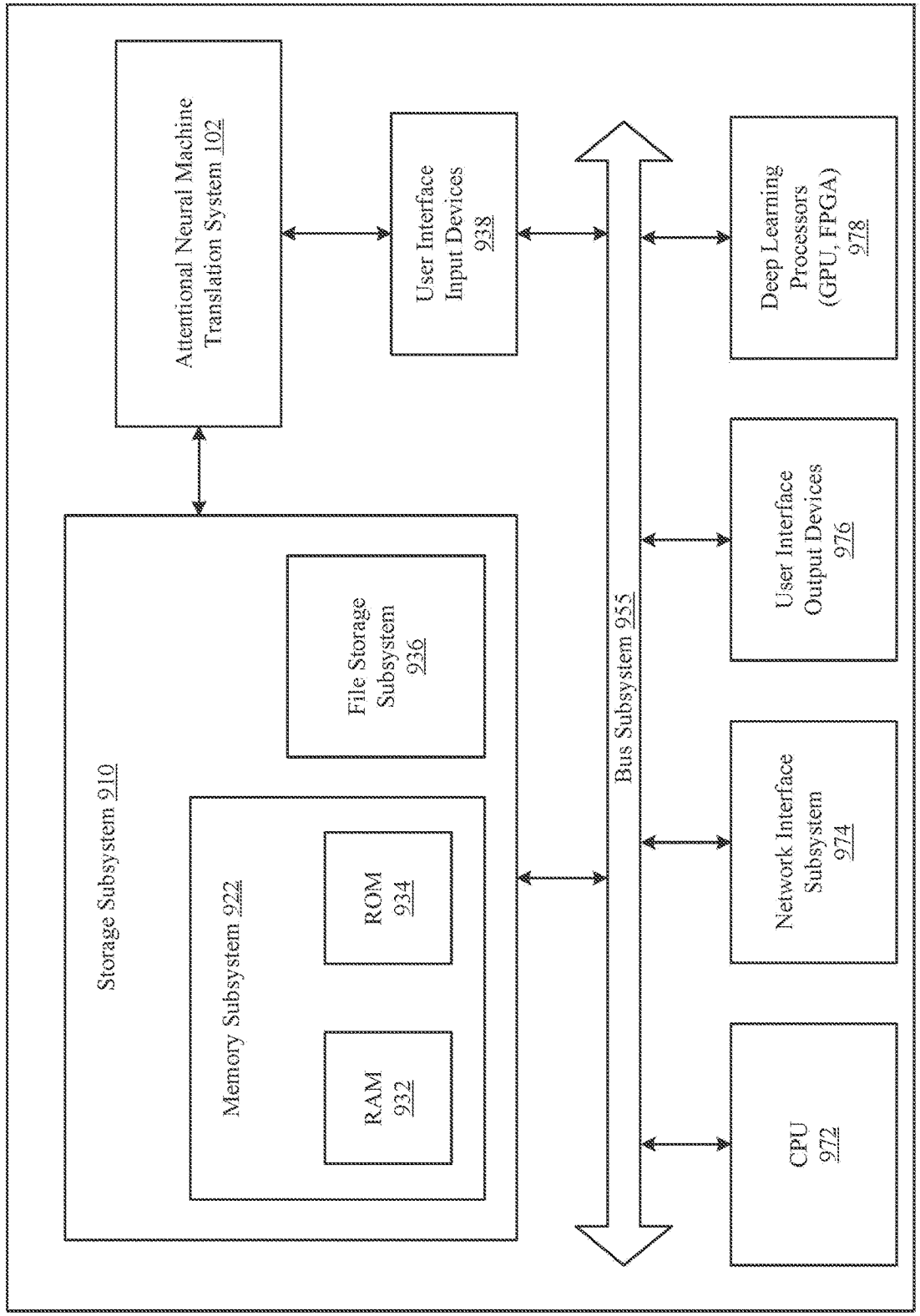
FIG. 9 – Computer System

NEURAL MACHINE TRANSLATION WITH LATENT TREE ATTENTION

CROSS REFERENCE TO OTHER APPLICATIONS

This application is a continuation of U.S. patent application Ser. No. 15/901,722 filed on Feb. 21, 2018 and claims priority to U.S. Provisional Patent Application Ser. No. 62/485,856 filed on Apr. 14, 2017, each of which is incorporated by reference in their entirety.

INCORPORATIONS

The following materials are incorporated by reference as if fully set forth herein:

Chris Dyer, Miguel Ballesteros, Wang Ling, Austin Matthews, and Noah A Smith. 2016a. Transition-based dependency parsing with stack long short-term memory. In EMNLP ("Dyer et al., 2016a");

Chris Dyer, Adhiguna Kuncoro, Miguel Ballesteros, and Noah Smith. 2016b. Recurrent neural network grammars. In NAACL ("Dyer et al., 2016b");

Adhiguna Kuncoro, Miguel Ballesteros, Lingpeng Kong, Chris Dyer, Graham Neubig, and Noah A. Smith. 2017. What do recurrent neural network grammars learn about syntax? In EACL ("Kuncoro et al.");

Junyoung Chung, Sungjin Ahn, and Yoshua Bengio. 2017. Hierarchical multiscale recurrent neural networks. In ICLR;

Akiko Eriguchi, Kazuma Hashimoto, and Yoshimasa Tsuruoka. 2016. Tree-to-sequence attentional neural machine translation. In ACL; and CS 224D: Deep Learning for NLP, Lecture Notes: Part I, Part II, Part III, Part IV, and Part V ("Socher et al.").

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. The technology disclosed uses deep neural networks like long short-term memory (LSTM) networks for natural language processing tasks.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Many efforts to exploit linguistic hierarchy in natural language processing tasks like machine translation make use of the output of a self-contained parser system trained from a human-annotated treebank. A second approach aims to jointly learn the task at hand and relevant aspects of linguistic hierarchy, inducing from an unannotated training dataset parse trees that may or may not correspond to treebank annotation practices.

Most deep learning models for natural language processing that aim to make use of linguistic hierarchy integrate an external parser, either to prescribe the recursive structure of the neural network or to provide a supervision signal or training data for a network that predicts its own structure. Some deep learning models take the second approach and treat hierarchical structure as a latent variable, applying inference over graph-based conditional random fields, the straight-through estimator, or policy gradient reinforcement learning to work around the inapplicability of gradient-based learning to problems with discrete latent states.

For the task of machine translation, syntactically-informed models have shown promise both inside and outside the deep learning context, with hierarchical phrase-based models frequently outperforming traditional ones and neural machine translation models augmented with morphosyntactic input features, a tree-structured encoder, and a jointly trained parser each outperforming purely-sequential baselines.

An opportunity arises to accomplish the longstanding goal of natural language processing to take advantage of the hierarchical structure of language without a priori annotation. Improved natural language processing may result.

BRIEF DESCRIPTION OF THE DRAWINGS

FIG. 1 shows one implementation of an environment in which the attentional neural machine translation system operates.

FIG. 2 illustrates one implementation of the RNNG encoder consuming a source sequence in a first language (e.g., German).

FIG. 3 depicts one implementation of the RNNG encoder processing the source sequence.

FIG. 4 illustrates one implementation of the attention-based RNNG decoder emitting a target sequence in a second language (e.g., English).

FIG. 5 depicts one implementation of the attention-based RNNG decoder processing the target sequence.

FIG. 6 is one example of the attention applied by the attention-based RNNG decoder for processing the target sequence.

FIG. 7 shows one implementation of attention-based phrase structure parsing by the attentional neural machine translation system.

FIG. 8 is one implementation of visualizations of attention applied by the attentional neural machine translation system.

FIG. 9 illustrates one implementation of a computer system that can be used to implement the attentional neural machine translation system.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

We introduce an attentional neural machine translation model for the task of machine translation that accomplishes the longstanding goal of natural language processing to take advantage of the hierarchical structure of language without a priori annotation. The model comprises a recurrent neural network grammar (RNNG) encoder with a novel attentional RNNG decoder and applies policy gradient reinforcement learning to induce unsupervised tree structures on both the source sequence and target sequence. When trained on character-level datasets with no explicit segmentation or parse annotation, the model learns a plausible segmentation and shallow parse, obtaining performance close to an attentional baseline.

The encoder and decoder RNNGs of the model are both tree-structured neural networks that predict their own constituency structure as they consume or emit text. The encoder and decoder networks produce tree structures of unconstrained arity while ingesting text at the character-level, allowing the model to discover and make use of structure within words. The parsing decisions of the encoder and decoder RNNGs are parameterized by a stochastic policy trained using a weighted sum of two objectives: a language model loss term that rewards predicting the next character with high likelihood, and a tree attention term that rewards one-to-one attentional correspondence between constituents in the encoder and decoder RNNGs.

We evaluate the model on the German-English language pair of the flickr30k dataset, where it obtains similar performance to a strong character-level baseline. Analysis of the latent trees produced by the encoder and decoder RNNGs shows that the model learns a reasonable segmentation and shallow parse, and most phrase-level constituents constructed while ingesting the German input sentence correspond meaningfully to constituents built while generating the English output.

Environment

FIG. 1 shows one implementation of an environment 100 in which the attentional neural machine translation system 102 operates. System 102 comprises a recurrent neural network grammar (RNNG) encoder 112 and an attention-based RNNG decoder 122, which are built on the recurrent neural network (RNN) architecture. Additional details about RNNG and its variants like stack-only recurrent neural network grammar (s-RNNG) can be found in Dyer et al., 2016b and Kuncoro et al. respectively, which are incorporated by reference as if fully set forth herein. Additional details about RNN architectures like long short-term memory (LSTM) and gated recurrent units (GRU) can be found in Socher et al., which is incorporated by reference as if fully set forth herein. Attention-based RNNG decoder 122 comprises an attender 132. Attender 132 comprises a comparator 142, an exponential normalizer 152, and a convex combinator 162.

System 102 translates a source sequence in a first language (e.g., German) into a target sequence in a second language (e.g., English). System 102 is trained on training data 105 by trainer 138. Training data 105 comprises source sequences 115 and target sequences 118. Trainer 138 comprises a teacher forcer 148 and a reinforcement learner 158. Environment 100 also includes validation data (not shown) that is used to evaluate system 102.

After being trained and deployed, system 102 receives inference data 155 via web applications running on client(s) 165 (e.g., Google Translate™). That is, system 102 receives translation requests which identify the source sequences in the first language, and responds to the translation requests in real-time by sending to the client(s) 165 the target sequences in the second language.

The system components of environment 100 are implemented by software running on varying types of computing devices. Example devices are a workstation, a server, a computing cluster, a blade server, and a server farm. The network(s) 125 couples the system components of environment 100, all in communication with each other (indicated by solid double-arrowed lines). The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. Additionally, a variety of authorization and authentication techniques, such as username/password, Open Authorization (OAuth), Kerberos, SecureID, digital certificates and more, can be used to secure the communications.

Having described the system components of environment 100, the discussion now turns to the RNNG encoder 112 and its processing.

RNNG Encoder

As discussed above, encoder 112 and decoder 122 are recurrent neural network grammar (RNNG) networks coupled to each other. In one implementation, the RNNG encoder 112 is a stack-only RNNG (described in Kuncoro et al.), and the RNNG decoder 122 is a stack-only RNNG augmented with constituent-level attention (e.g., character-level attention).

Regarding recurrent neural network grammar (RNNG), RNNG is a top-down transition-based model that jointly builds a sentence representation and a parse tree, representing the parser state with a Stack LSTM (described in Dyer et al., 2016a), and using a bidirectional LSTM (Bi-LSTM) as a constituent composition function.

An RNNG defines a joint probability distribution over string terminals and phrase-structure nonterminals. Formally, the RNNG is defined by a triple $\langle N, \Sigma, \Theta \rangle$, where N denotes the set of nonterminal symbols (NP (noun phrase), VP (verb phrase), etc.), $\Sigma$ denotes the set of all terminal symbols, and $\Theta$ denotes the set of model parameters. Instead of relying on hand-crafted rules to compose more fine-grained phrase representations, the RNNG implicitly parameterizes the information passed through compositions of phrases (in $\Theta$ and the neural network architecture), hence weakening the strong independence assumptions in classical probabilistic context-free grammars.

The RNNG is based on an abstract state machine like those used in transition-based parsing, with its algorithmic state comprising a (i) stack of partially completed constituents, (ii) a buffer of already-generated terminal symbols, and (iii) a list of past actions. To generate a sentence x and its phrase-structure tree y, the RNNG samples a sequence of actions to construct y top-down. Given y, there is one such sequence a=⟨$a_1$, . . . , $a_n$⟩ used during the supervised training. Each of the three components of the RNNG are embedded with LSTMs, and the hidden state of at least one the LSTMs is used to predict a softmax over all feasible actions for a current timestep.

The RNNG uses three different actions:

NT (nonterminal): which introduces an open non-terminal onto the stack, e.g., "(NP)";

GEN (generation): which generates a terminal symbol and places it on the stack and buffer; and RED (reduce): which indicates that a constituent is now complete. The elements of the stack that comprise the current constituent (going back to the last open non-terminal) are popped, and a composition function is executed by a bi-directional LSTM (Bi-LSTM), yielding a single, explicit composed representation that is pushed onto the stack.

At each timestep, the model encodes the stack, buffer, and past actions, with a separate LSTM for each component as features to define a distribution over the next action to take (conditioned on the full algorithmic state). A key element of the RNNG is the composition function, which reduces or transforms a completed constituent or the constituent's parts and the non-terminal label into a single explicit element on the stack. This function computes a vector representation of the new constituent using a Bi-LSTM.

Since the RNNG is a generative model, it attempts to maximize p(x, y), the joint distribution of strings and trees, defined as:

$$p(x, y) = p(a) = \prod_{t=1}^{n} p(a_t | a_1, \ldots, a_{t-1})$$

In other words, p(x, y) is defined as a product of local probabilities, conditioned on all past actions. The joint probability estimate p(x, y) can be used for both phrase-structure parsing (finding arg $\max_y p(x|y)$) and language modeling (finding p(x)) by marginalizing over the set of possible parses for x). Both inference problems can be solved using an importance sampling procedure (described in Dyer et al., 2016b and Kuncoro et al.).

In one implementation, the RNNG encoder 112 differs from Dyer et al., 2016b in that it lacks separate new nonterminal tokens for different phrase types, and thus does not include the phrase type as an input to the composition function implemented by the Bi-LSTM. Instead, the values of $x_i$ for the encoder are fixed to a constant $x^{enc}$ while the values of $x_j^{dec}$ for the RNNG decoder 122 are determined through an attention procedure described below with reference to FIG. 5.

As originally described, the RNNG predicts parser transitions using a one-layer tanh perceptron with three concatenated inputs: the last state of a unidirectional LSTM over the stack contents, the last state of a unidirectional LSTM over the reversed buffer of unparsed tokens, and the result of an LSTM over the past transitions. All three of these states can be computed with at most one LSTM step per parser transition using the Stack LSTM algorithm described in Dyer et al., 2016a.

But such a baseline RNNG is outperformed by one which conditions the parser transitions only on the stack representation, i.e., the stack-only RNNG (described in Kuncoro et al.). In some implementations, restricting our model to this stack-only case allows both the RNNG encoder 112 and the RNNG decoder 122 to be supervised using a language model loss, while allowing the model access to the last state of the unidirectional LSTM over the reversed buffer of unparsed tokens gives it an efficient way to predict the next character and obtain zero loss.

The following discussion with respect to FIGS. 2, 3, 4, and 5 focuses on the disclosed attention mechanism in the context of translating a German source sequence "Die hungrige Katze weht" into an English target sequence "The hungry cat meows".

FIG. 2 illustrates one implementation of the RNNG encoder 112 consuming 200 a source sequence in a first language (e.g., German). FIG. 3 depicts one implementation of the RNNG encoder 112 processing 300 the source sequence.

In FIG. 2, the example German source sequence is "Die hungrige Katze weht". In the illustrated implementation, the RNNG encoder 112 takes six NT (nonterminal) actions. Each NT action of the RNNG encoder 112 is vectorized, encoded or embedded as $x^{enc}$. In one implementation, $x^{enc}$ is a constant or fixed vector which serves as a common embedding for different phrase type constituents of the phrase tree structures of the source sequence. Examples of phrase type constituents include noun phrase (NP), verb phrase (VP), propositional phrase (PP), and sentence (S). In other words, according to this implementation, at different timesteps of the encoding, the value of the vector embedding the NT action remains fixed as $x^{enc}$ and does not change across the encoding timesteps. Propagation of a common embedding $x^{enc}$ across the encoding timesteps is also illustrated in FIG. 3.

The state or the hidden state of the RNNG encoder 112 "immediately before" taking an NT action is represented by $s_i^{enc}$. In other words, $s_i^{enc}$ represent encoder tree nodes that identify the encoder's states when (immediately before) predicting phrase types of phrase tree structures of the source sequence. In the illustrated implementation in FIG. 3, six such hidden states or encoder tree nodes are shown (e.g., at encoding timesteps $t_0$, $t_1$, $t_2$, $t_8$, $t_{19}$, $t_{29}$), each of which is complemented by one of the so-called encoder compositional embeddings $c_i^{enc}$ produced as a result of the RNNG encoder 112 taking a RED (reduce) action (e.g., at encoding timesteps $t_6$, $t_{17}$, $t_{25}$, $t_{27}$, $t_{34}$, $t_{35}$). In one implementation, upon taking a RED action, the RNNG encoder 112 uses a bi-directional LSTM (Bi-LSTM) to encode the current token constituents of a phrase tree structure of the source sequence going back to the last open phrase type nonterminal, without encoding the open phrase type constituent $x^{enc}$. The output of the Bi-LSTM is the encoder compositional embedding $c_i^{enc}$. For example, at encoding timestep $t_6$, the first RED action in FIG. 3 causes bi-directional encoding of the character tokens $x^{D+i+e}$ in the German word "Die" by the Bi-LSTM. The bi-directional encoding produces the encoder compositional embedding $c_1^{enc}$ which complements the hidden state $s_1^{enc}$ of the RNNG encoder 112 immediately prior to taking the third NT action.

Regarding the tokens of the source sequence, they are consumed when the RNNG encoder 112 takes a GEN (generate) action. In the illustrated implementation in FIG. 3, the tokens are character-based token embeddings $x^{tokens}$. In one implementation, the character-based token embeddings $x^{tokens}$ can be densely encoded using real-valued vectors. In another implementation, the character-based token embeddings $x^{tokens}$ can be sparsely encoded using one-hot vectors.

Regarding the input/output workflow in FIG. 3, the RNNG encoder 112 is initialized with a random or predetermined hidden state $s_6^{enc}$. At each encoding timestep, the hidden state of the RNNG encoder 112 (encoder state) is fed to an encoder softmax layer which determines whether the next action is a RED, GEN or NT. When the encoder softmax layer outputs an NT action at a current encoding timestep in response to processing a current hidden state of the RNNG encoder 112, fixed embedding $x^{enc}$ is obtained and fed as input to the RNNG encoder 112 at the next encoding timestep for gated-LSTM type processing to produce the next hidden state (described in Socher et al.).

When the encoder softmax layer outputs a RED action at a current encoding timestep in response to processing a current hidden state of the RNNG encoder 112, an encoder compositional embedding $c_i^{enc}$ is produced by the composite function of the Bi-LSTM and fed as input to the RNNG encoder 112 at the next encoding timestep for gated-LSTM type processing to produce the next hidden state (described in Socher et al.). The input to the Bi-LSTM are the character-based token embeddings $x^{tokens}$ of the constituent tokens of the current phrase structure, fed in forward and reverse directions to the Bi-LSTM without the phrase type fixed embedding $x^{enc}$.

When the encoder softmax layer outputs a GEN action at a current encoding timestep in response to processing a current hidden state of the RNNG encoder 112, a character-based token $x^{token}$ is generated and fed as input to the RNNG encoder 112 at the next encoding timestep for gated-LSTM type processing to produce the next hidden state (described in Socher et al.). In one implementation, when the GEN action is chosen, the RNNG encoder 112 passes the current encoder state through a one-layer vocabulary softmax perceptron, giving the probability that the next token is each of the characters in the vocabulary.

Having described the RNNG encoder 112 and its processing, the discussion now turns to the attention-based RNNG decoder 122 and its processing.

Attention-Based RNNG Decoder

While the RNNG encoder 112 uses a single token $x^{enc}$ to represent a new nonterminal, the RNNG decoder 122 represents a new nonterminal on the stack as a sum weighted by structural attention of the phrase representations of all nonterminal tree nodes produced by the encoder. In one implementation, we use the normalized dot products between the decoder stack representation $s_j^{dec}$ and the stack representation at each encoder node $s_j^{enc}$ (that is, the hidden state of the decoder Stack LSTM up to and including $x_j^{enc}$ but not $c_j^{enc}$) as coefficients in a weighted sum of the phrase embeddings $c_i^{enc}$ corresponding to the encoder nodes:

$$a_{ij} = softmax_{all\ i} = s_i^{enc} \cdot s_j^{dec} \quad \text{Step (a)}$$

$$x_j^{dec} = \sum_i a_{ij} c_i^{enc} \quad \text{Step (b)}$$

The dot products between encoder and decoder stack representations are a measure of structural similarity between the (left context of) the current decoder state and the encoder state. Within a particular decoder nonterminal, the model reduces to ordinary sequence-to-sequence transduction. Starting from the encoder's representation of the corresponding nonterminal or a weighted combination of such representations, the decoder emits a translated sequence of child constituents (both nonterminal and terminal) one by one—applying attention only when emitting nonterminal children.

FIG. 4 illustrates one implementation of the attention-based RNNG decoder 122 emitting 400 a target sequence in a second language (e.g., English). FIG. 5 depicts one implementation of the attention-based RNNG decoder 122 processing 500 the target sequence.

In FIG. 4, the example English target sequence emitted by the RNNG decoder 122 is "The hungry cat meows". In the illustrated implementation, the RNNG decoder 122 takes six NT (nonterminal) actions. NT actions of the RNNG decoder 122 are vectorized, encoded or embedded as $x_j^{dec}$, which are referred to herein as the "decoder embeddings" for predicted phrase types of phrase tree structures of the target sequence. The decoder embeddings $x_j^{dec}$ are determined by an attention mechanism implemented by the attender 132 (discussed above and also further discussed in greater detail with respect to FIGS. 5 and 6). Examples of predicted phrase types include noun phrase (NP), verb phrase (VP), propositional phrase (PP), and sentence (S).

The state or the hidden state of the RNNG decoder 122 "immediately before" taking an NT action is represented by $s_j^{dec}$. In other words, $s_j^{dec}$ represent decoder tree nodes that identify the decoder's states when (immediately before) predicting phrase types of phrase tree structures of the target sequence. In the illustrated implementation in FIG. 5, six such hidden states or decoder tree nodes are shown (e.g., at decoding timesteps $t_0$, $t_1$, $t_2$, $t_8$, $t_{17}$, $t_{25}$), each of which is complemented by one of the so-called decoder compositional embeddings $c_j^{dec}$ produced as a result of the RNNG decoder 122 taking a RED (reduce) action (e.g., at decoding timesteps $t_6$, $t_{15}$, $t_{21}$, $t_{23}$, $t_{32}$, $t_{33}$). In one implementation, upon taking a RED action, the RNNG decoder 122 uses a bi-directional LSTM (Bi-LSTM) to encode the current token constituents of a phrase tree structure of the target sequence going back to the last open phrase type nonterminal, without encoding the open phrase type constituent $x_j^{dec}$. The output of the Bi-LSTM is the decoder compositional embedding $c_j^{dec}$. For example, at decoding timestep $t_6$, the first RED action in FIG. 5 causes bi-directional encoding of the character tokens $x^{T+h+e}$ in the English word "The" by the Bi-LSTM. The bi-directional encoding produces the decoder compositional embedding $c_1^{dec}$ which complements the hidden state $s_1^{dec}$ of the RNNG decoder 122 immediately prior to taking the third NT action.

Regarding the tokens of the target sequence, they are emitted when the RNNG decoder 122 takes a GEN (generate) action. In the illustrated implementation in FIG. 5, the tokens are character-based token embeddings $x^{tokens}$. In one implementation, the character-based token embeddings $x^{tokens}$ can be densely encoded using real-valued vectors. In another implementation, the character-based token embeddings $x^{tokens}$ can be sparsely encoded using one-hot vectors.

Regarding the input/output workflow in FIG. 5, the RNNG decoder 122 is initialized with a random or predetermined hidden state $s_6^{dec}$. In one implementation, an ultimate or final encoder compositional embedding of the source sequence (e.g., $c_6^{dec}$) is used as a decoder embedding for an initially predicted phrase type of the target sequence (e.g., $x_1^{dec}$). That is $x_1^{dec} = c_6^{enc}$, as shown in FIGS. 4 and 5. At each decoding timestep, the hidden state of the RNNG decoder 122 (decoder state) is fed to a decoder softmax layer which determines whether the next action is a RED, GEN or NT. When the decoder softmax layer outputs an NT action at a current decoding timestep in response to processing a current hidden state of the RNNG decoder 122, decoder embedding $x_j^{dec}$ is determined by the attention mechanism implemented by the attender 132 and fed as input to the RNNG decoder 122 at the next decoding timestep for gated-LSTM type processing to produce the next hidden state (described in Socher et al.).

When the decoder softmax layer outputs a RED action at a current decoding timestep in response to processing a current hidden state of the RNNG decoder 122, a decoder compositional embedding $c_j^{dec}$ is produced by the composite function of the Bi-LSTM and fed as input to the RNNG decoder 122 at the next decoding timestep for gated-LSTM type processing to produce the next hidden state (described in Socher et al.). The input to the Bi-LSTM are the character-based token embeddings $x^{tokens}$ of the constituent tokens of the current phrase structure, fed in forward and reverse directions to the Bi-LSTM without the phrase type decoder embedding $x_j^{dec}$. In one implementation, the encoder and decoder share a common Bi-LSTM, and in another implementation they use separate Bi-LSTMs.

When the decoder softmax layer outputs a GEN action at a current decoding timestep in response to processing a current hidden state of the RNNG decoder 122, a character-based token $x^{token}$ is generated and fed as input to the RNNG decoder 122 at the next decoding timestep for gated-LSTM type processing to produce the next hidden state (described in Socher et al.). In one implementation, when the GEN action is chosen, the RNNG decoder 122 passes the current decoder state through a one-layer vocabulary softmax perceptron, giving the probability that the next token is each of the characters in the vocabulary.

Attention

FIG. 6 is one example of the attention 600 applied by the attention-based RNNG decoder 122 for processing the target sequence. As discussed above, the RNNG decoder 122 comprises an attender 132. Attender 132 comprises a comparator 142, an exponential normalizer 152, and a convex combinator 162. Comparator 142 compares a decoder tree node representing a current decoder state (e.g., $s_i^{dec}$ in FIG. 6) with encoder tree nodes representing different encoder states (e.g., $s_1^{enc}, s_2^{enc}, s_3^{enc}, s_4^{enc}, s_5^{enc}, s_6^{enc}$ in FIG. 6) during the encoding.

The comparison can be performed by the comparator 142 using at least one of an inner product, a bilinear function, and a single layer neural network. The comparison by the comparator 142 can measure syntactic structural similarity between the phrase tree structures of the source sequence and the phrase tree structures of the target sequence.

The results of the comparison by the comparator 142 are so-called attention values. Attention values are unnormalized scalars (illustrated in FIGS. 6 as $\lambda_1$ to $\lambda_6$). The exponential normalizer 152 (e.g., a softmax layer) exponentially normalizes the attention values to produce attention weights. Attention weights are positively normalized scalars that add up to unity (illustrated in FIG. 6 as $\alpha_1$ to $\alpha_6$). A comparison by the comparator 142 between the most syntactically similar phrase tree structures of the source and target sequences (e.g., $s_1^{dec}$ and $s_1^{enc}$ in FIG. 6) can produce a highest attention weight, i.e., closest to one (e.g., $\alpha_1$ in FIG. 6) because the word "Die" in German is syntactically most similar to the word "The" in English. In another example, a comparison by the comparator 142 between the most syntactically similar phrase tree structures of the source and target sequences (e.g., $s_2^{dec}$ and $s_2^{enc}$) can produce a highest attention weight, i.e., closest to one because the word "hungrige" in German is syntactically most similar to the word "hungry" in English since both the words are preceded by a definite article and are the beginning of a noun phrase.

The comparison and the exponential normalization are mathematically depicted by Step (a) discussed above.

Convex combinator 162 calculates or determines a weighted sum of the encoder compositional embeddings corresponding to the encoder tree nodes (e.g., $c_1^{enc}, c_2^{enc}$, $c_3^{enc}, c_4^{enc}, c_5^{enc}, c_6^{enc}$ in FIG. 6), using the exponentially normalized results as the respective attention weights (e.g., $\alpha_1$ to $\alpha_6$ in FIG. 6). In other words, a decoder embedding (e.g., $x_3^{dec}$ in FIG. 6) for a predicted phrase type (e.g., at decoding timestep $t_3$ in FIG. 5) of each of the phrase tree structures of the target sequence is a convex combination of encoder compositional embeddings (e.g., $c_1^{enc}, c_2^{enc}, c_3^{enc}$, $c_4^{enc}, c_5^{enc}, c_6^{enc}$ in FIG. 6) scaled by the attention weights (e.g., $\alpha_1$ to $\alpha_6$ in FIG. 6). The convex combination is mathematically depicted by Step (b) discussed above.

Having described the attention-based RNNG decoder 122 and its processing, the discussion now turns to the attention-based phrase structure parsing 600.

Attention-Based Phrase Structure Parsing

FIG. 7 shows one implementation of attention-based phrase structure parsing 700 by the attentional neural machine translation system 102.

At a given timestep during either encoding or decoding there are three possible transitions (although one or more may be forbidden): begin a new nonterminal constituent (NT), predict and ingest a terminal (GEN), or end the current nonterminal (REDUCE). If the chosen transition is NT, the RNNG adds a new-nonterminal token to the active constituent and begins a new nonterminal constituent. If the transition is GEN, the RNNG predicts the next token and adds the ground-truth next token from the context buffer at the cursor location. If the transition is REDUCE, the contents of the active nonterminal are passed to the composition function, the new-nonterminal token is replaced with the result of the composition, and the Stack LSTM rolls back to the previously active constituent. In all three cases, the Stack LSTM then advances one step.

Having described the attention-based phrase structure parsing 700, the discussion now turns to the training of the attentional neural machine translation system 102.

Training

We formulate our model as a stochastic computation graph, leading to a training paradigm (implemented by the trainer 138) that combines backpropagation (which provides the exact gradient through deterministic nodes and is implemented by the teacher forcer 148) and vanilla policy gradient (which provides a Monte Carlo estimator for the gradient through stochastic nodes and is implemented by the reinforcement learner 158). There are several kinds of training signals in our model. First, when the encoder or decoder chooses the GEN action it passes the current stack state through a one-layer softmax perceptron, giving the probability that the next token is each of the characters in the vocabulary. The language model loss $\mathcal{L}_k$ for each generated token is the negative log probability assigned to the ground-truth next token. The other differentiable training signal is the coverage loss $\mathcal{L}_c$, which is a measure of how much the attention weights diverge from the ideal of a one-to-one mapping. This penalty is computed as a sum of three MSE terms:

$$\mathcal{L}_c = \underset{all\ i}{\text{mean}}\left(1 - \sum_{all\ j}\alpha_{ij}\right)^2 + \underset{all\ i}{\text{mean}}\left(1 - \underset{all\ j}{\text{max}}\alpha_{ij}\right)^2 + \underset{all\ j}{\text{mean}}\left(1 - \underset{all\ i}{\text{max}}\alpha_{ij}\right)^2$$

Backpropagation using the differentiable losses affects only the weights of the output softmax perceptron. The overall loss function for these weights is a weighted sum of all $\mathcal{L}_k$ terms and $\mathcal{L}_c$:

$$\mathcal{L} = 100\mathcal{L}_c + 10\sum_{all\ k}\mathcal{L}_k$$

There are additionally non-differentiable rewards r that bias the model towards or away from certain kinds of tree structures. Here, negative numbers correspond to penalties. We assign a tree reward of −1 when the model predicts a REDUCE with only one child constituent (REDUCE with zero child constituents is forbidden) or predicts two REDUCE or NT transitions in a row. This biases the model against unary branching and reduces its likelihood of producing an exclusively left- or right-branching tree structure. In addition, for all constituents except the root, we assign a tree reward based on the size and type of its children. If n and t are the number of nonterminal and terminal children, this reward is 4t if all children are terminal and $9\sqrt{n}$ otherwise. A reward structure like this biases the model against freely mixing terminals and nonterminals within the same constituent and provides incentive to build substantial tree structures early on in training so the model does not get stuck in trivial local minima. Within both the encoder and decoder, each stochastic action node has a corresponding tree reward $r_k$ if the action was REDUCE (otherwise zero) and a corresponding language model loss $\mathcal{L}_k$ if the action was GEN (otherwise zero). We subtract an exponential moving average baseline from each tree reward and additional exponential moving average baselines—computed independently for each character z in the vocabulary, because we want to reduce the effect of character frequency—from the language model losses. If GEN(k) is the number of GEN transitions among actions one through k, and γ is a decay constant, the final reward $R_k^m$ for action k with m ∈ {enc, dec} is:

$$\hat{r}_k = r_k - r_{baseline}$$

$$\hat{\mathcal{L}}_k = \mathcal{L}_k - \mathcal{L}_{baseline}(z_k)$$

$$\hat{R}_k = \sum_{\kappa=k}^{K_m} \gamma^{GEN(\kappa)-GEN(k)}\left(\hat{r}_\kappa - \hat{\mathcal{L}}_\kappa^m\right)$$

$$\mathcal{R}_k^{enc} = \hat{R}_k - \mathcal{L}_c - (m = enc)\sum_{\kappa=1}^{K_{dec}}\mathcal{L}_k^{dec}$$

These rewards define the gradient that each stochastic node (with normalized action probabilities $P_k^a$ and chosen action $a_k$) produces during backpropagation according to the standard multinomial score function estimator (REINFORCE):

$$\nabla_\theta p_k^a = \underset{a_k=a}{\text{mean}}\mathcal{R}_k\nabla_\theta\log p_k^{a_k} = \underset{a_k=a}{\text{mean}}\frac{-\mathcal{R}_k}{p_k^{a_k}}$$

Having described the training of the attentional neural machine translation system 102, the discussion now turns to the visualizations 800 of attention applied by the attentional neural machine translation system 102.

Attention Visualizations

FIG. 8 is one implementation of visualizations 800 of attention applied by the attentional neural machine translation system 102. Attention visualizations for two sentences from the development set is shown. Attention between two constituents is represented by a shaded rectangle whose projections on the x and y axes cover the encoder and decoder constituents respectively.

We evaluated our model on the German-English language pair of the flickr30k data, the textual component of the WMT Multimodal Translation shared task. An attentional sequence-to-sequence model with two layers and 384 hidden units from the OpenNMT project was run at the character level as a baseline, obtaining 32.0 test BLEU with greedy inference. Our model with the same hidden size and greedy inference achieves test BLEU of 28.5 after removing repeated bigrams. We implemented the model in PyTorch, benefiting from its strong support for dynamic and stochastic computation graphs, and trained with batch size 10 and the Adam optimizer with early stopping after 12 epochs. Character embeddings and the encoder's embedding were initialized to random 384-dimensional vectors. The value of γ and the decay constant for the baselines' exponential moving average were both set to 0.95.

A random selection of translations is included in the supplemental material, while two attention plots are shown in FIG. 8. FIG. 8 also demonstrates a common pathology of the model, where a phrasal encoder constituent would be attended to during decoding of the head word of the corresponding decoder constituent, while the head word of the encoder constituent would be attended to during decoding of the decoder constituent corresponding to the whole phrase. Another common pathology is repeated sentence fragments in the translation, which are likely generated because the model cannot condition future attention directly on past attention weights (the "input feeding" approach). Translation quality also suffers because of our use of a stack-only RNNG, which we chose because an RNNG with both stack and buffer inputs is incompatible with a language model loss. During encoding, the model decides at the very beginning of the sentence how deeply to embed the first character. But with a stack-only RNNG, it makes this decision randomly, since it is not able to use the buffer representation—which contains the entire sentence.

Having described the training of the visualizations 800 of attention applied by the attentional neural machine translation system 102, the discussion now turns to the computer system 900 that can be used to implement the attentional neural machine translation system 102.

Computer System

FIG. 9 illustrates one implementation of a computer system 900 that can be used to implement the attentional neural machine translation system 102. Computer system 900 includes at least one central processing unit (CPU) 972 that communicates with a number of peripheral devices via bus subsystem 955. These peripheral devices can include a storage subsystem 910 including, for example, memory devices and a file storage subsystem 936, user interface input devices 939, user interface output devices 976, and a network interface subsystem 974. The input and output devices allow user interaction with computer system 900. Network interface subsystem 974 provides an interface to outside networks, including an interface to corresponding interface devices in other computer systems. The attentional neural machine translation system 102 can be communicably linked to the storage subsystem 910 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. These software modules are generally executed by deep learning processors 978.

Deep learning processors 978 can be graphics processing units (GPUs) or field-programmable gate arrays (FPGAs). Deep learning processors 978 can be hosted by a deep learning cloud platform such as Google Cloud Platform™, Xilinx™, and Cirrascale™. Examples of deep learning processors 978 include Google's Tensor Processing Unit (TPU)™, rackmount solutions like GX4 Rackmount Series™, GX9 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 922 used in the storage subsystem 910 can include a number of memories including a main random access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 910, or in other machines accessible by the processor.

Bus subsystem 955 provides a mechanism for letting the various components and subsystems of computer system 900 communicate with each other as intended. Although bus subsystem 955 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or less components than the computer system depicted in FIG. 9.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Particular Implementations

We describe a system and various implementations of an attentional neural machine translation model for translating a source sequence in a first language into a target sequence in a second language. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

We introduce a new approach to leveraging unsupervised tree structures in natural language processing tasks like machine translation. Our experiments demonstrate that a small-scale machine learning dataset contains sufficient training signal to infer latent linguistic structure. In some implementations, value function baselines can replace exponential moving averages, pure reinforcement learning can replace teacher forcing, and beam search can be used in place of greedy inference. Solutions to the translation pathologies presented can be replaced by variational inference using a teacher model that can see the buffer and helps train a stack-only student model.

The technology disclosed presents an attentional neural machine translation system for translating a source sequence in a first language into a target sequence in a second language. The attentional neural machine translation system runs on numerous parallel processors.

The attentional neural machine translation system comprises an encoder. The encoder can be a first stack-only recurrent neural network grammar (s-RNNG) network which runs on one of the numerous parallel processors. The encoder encodes tokens of the source sequence and phrase tree structures of the source sequence. At least one of the phrase tree structures of the source sequence includes (i) an encoder tree node that represents an encoder state when predicting a phrase type of said phrase tree structure of the source sequence and (ii) an encoder compositional embedding that represents constituents of said phrase tree structure of the source sequence.

The attentional neural machine translation system comprises an attention-based decoder. The attention-based decoder can be a second s-RNNG network which runs on one of the numerous parallel processors. The attention-based decoder outputs tokens of the target sequence and phrase tree structures of the target sequence. A decoder embedding for a predicted phrase type of each of the phrase tree structures of the target sequence is a convex combination of encoder compositional embeddings scaled by attention weights.

The system can compare a decoder tree node representing a current decoder state with encoder tree nodes representing different encoder states during the encoding. This is accomplished by (i) exponentially normalizing results of the comparison (so-called attention values) and (ii) calculating a weighted sum of encoder compositional embeddings corresponding to the encoder tree nodes, using the exponentially normalized results as the respective attention weights.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The comparison can be performed using at least one of an inner product, a bilinear function, and a single layer neural network. The comparison can measure syntactic structural similarity between the phrase tree structures of the source sequence and the phrase tree structures of the target sequence. A comparison between the most syntactically similar phrase tree structures of the source and target sequences can produce a highest attention weight.

The tokens can be character-based tokens. In one implementation, the character-based tokens can be densely encoded using real-valued vectors. In another implementation, the character-based tokens can be sparsely encoded using one-hot vectors.

The system can use a fixed vector as a common embedding for different phrase type constituents of the phrase tree structures of the source sequence.

An encoder compositional embedding can encode one or more character-based token constituents, without encoding a phrase type constituent.

The system can use an ultimate encoder compositional embedding of the source sequence as a decoder embedding for an initially predicted phrase type of the target sequence.

The system can use policy gradient reinforcement learning to induce unsupervised phrase tree structures of both the source and target sequences.

The encoder and the attention-based decoder can be long short-term memory (LSTM) networks.

The encoder and the attention-based decoder can each include a bi-directional LSTM (Bi-LSTM) that calculates encoder and decoder compositional embeddings.

The phrase tree structures can be constituency parse tree structures. The phrase tree structures can be dependency parse tree structures.

Other implementations may include a non-transitory computer readable storage medium storing instructions executable by a processor to perform actions of the system described above. Each of the features discussed in the particular implementation section for other implementations apply equally to this implementation. As indicated above, all the other features are not repeated here and should be considered repeated by reference.

The technology disclosed presents a recurrent neural network grammar (RNNG)-based machine translation system for translating a source sequence in a first language into a target sequence in a second language. The RNNG-based machine translation system runs on numerous parallel processors.

The RNNG-based machine translation system comprises an RNGG encoder which runs on one of the numerous parallel processors. The RNNG encoder encodes tokens of the source sequence and phrase tree structures of the source sequence by embedding character-based token constituents of each phrase tree structure in an encoder compositional vector.

The RNNG-based machine translation system comprises an RNGG attention-based decoder which runs on one of the numerous parallel processors. The RNNG attention-based decoder outputs tokens of the target sequence and phrase tree structures of the target sequence categorized by a phrase type, with a vector representing the phrase type calculated by attending over encoder compositional vectors, with the attention conditioned on a comparison between a current RNNG decoder state and RNNG encoder states during the encoding.

Each of the features discussed in the particular implementation section for other implementations apply equally to this implementation. As indicated above, all the other features are not repeated here and should be considered repeated by reference.

The system can parameterize parsing decisions of the RNNG encoder and the RNNG attention-based decoder by a stochastic policy trained using a weighted sum of multiple objective functions. An objective function can be a language model loss term that rewards predicting a next character-based token with high likelihood. An objective function can be a tree attention term that rewards one-to-one attentional correspondence between constituents in the RNNG encoder and the RNNG attention-based decoder.

The comparison can be performed using at least one of an inner product, a bilinear function, and a single layer neural network. The comparison can measure syntactic structural similarity between the phrase tree structures of the source sequence and the phrase tree structures of the target sequence. A comparison between the most syntactically similar phrase tree structures of the source and target sequences can produce a highest attention weight.

Other implementations may include a non-transitory computer readable storage medium storing instructions executable by a processor to perform actions of the system described above.

The technology disclosed presents an attentional neural machine translation method of translating a source sequence in a first language into a target sequence in a second language.

The method includes encoding tokens of the source sequence and phrase tree structures of the source sequence using a recurrent neural network grammar (RNNG) encoder. At least one of the phrase tree structures of the source sequence includes (i) an encoder tree node that represents an encoder state when predicting a phrase type of said phrase tree structure of the source sequence and (ii) an encoder compositional embedding that represents constituents of said phrase tree structure of the source sequence.

The method includes outputting tokens of the target sequence and phrase tree structures of the target sequence using an RNNG attention-based decoder. A decoder embedding for a predicted phrase type of each of the phrase tree structures of the target sequence is a convex combination of encoder compositional embeddings scaled by attention weights.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above. Each of the features discussed in the particular implementation section for other implementations apply equally to this implementation. As indicated above, all the other features are not repeated here and should be considered repeated by reference.

The technology disclosed presents a recurrent neural network grammar (RNNG)-based machine translation method of translating a source sequence in a first language into a target sequence in a second language.

The method includes using an RNNG encoder to encode tokens of the source sequence and phrase tree structures of the source sequence by embedding character-based token constituents of each phrase tree structure in an encoder compositional vector.

The method includes using an RNNG attention-based decoder to output tokens of the target sequence and phrase tree structures of the target sequence categorized by a phrase type, with a vector representing the phrase type calculated by attending over encoder compositional vectors, with the attention conditioned on a comparison between a current RNNG decoder state and RNNG encoder states during the encoding.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above. Each of the features discussed in the particular implementation section for other implementations apply equally to this implementation. As indicated above, all the other features are not repeated here and should be considered repeated by reference.

What is claimed is:

1. A machine translation system comprising:
   a memory storing an encoder and an attention-based decoder, and a plurality of processor-executed instructions for operating the encoder and the attention-based decoder; and
   a processor executing the plurality of processor-executable instructions to:
   encode tokens of a source sequence in a first language over a plurality of encoding time steps, wherein each of the tokens of the source sequence corresponds to a character from the source sequence, wherein at each encoding time step the encoder:
   pushes a non-terminal token to an encoder stack, the non-terminal token corresponding to a phrase type;
   pushes a terminal token to the encoder stack;
   pops tokens off the encoder stack to a last pushed non-terminal token,
   generates a new token using a composition function applied to the popped tokens, and pushes the new token onto the encoder stack,
   wherein non-terminal tokens are vectorized into a common embedding for different phrase types across encoding time steps without differentiating among the different phrase types; and
   generate, by the attention-based decoder, non-terminal tokens based on attention to the tokens on the encoder stack, and outputs tokens of a target sequence in a second language based on the attention.

2. The system of claim 1, wherein each of the tokens of the source sequence corresponds to a character from the source sequence.

3. The system of claim 1, wherein the tokens of the source sequence are densely encoded using real-valued vectors.

4. The system of claim 1, wherein the tokens of the source sequence are sparsely encoded using one-hot vectors.

5. The system of claim 1, wherein a phrase tree structure of both the source and target sequences includes one or more character-based token constituents and a phrase type constituent.

6. The system of claim 5, wherein a constant vector is used as the common embedding for different phrase types.

7. The system of claim 5, wherein an encoder compositional embedding encodes one or more character-based token constituents, without encoding a phrase type constituent.

8. The system of claim 1, further configured to:
   use an ultimate encoder compositional embedding of the source sequence as a decoder embedding for an initially predicted phrase type of the target sequence.

9. The system of claim 1, further configured to:
   use policy gradient reinforcement learning to induce unsupervised phrase tree structures of both the source and target sequences.

10. The system of claim 1, wherein the encoder and the attention-based decoder are long short-term memory (LSTM) networks.

11. The system of claim 10, wherein each of the encoder and the attention-based decoder includes a bi-directional LSTM (Bi-LSTM) that calculates encoder and decoder compositional embeddings.

12. The system of claim 1, wherein the encoder and the attention-based decoder are stack-only recurrent neural network grammar (s-RNNG) networks.

13. A method for machine translation comprising:
   encoding tokens of a source sequence in a first language over a plurality of encoding time steps, wherein each of the tokens of the source sequence corresponds to a character from the source sequence;
   at each encoding time step:
   pushing a non-terminal token to an encoder stack, the non-terminal token corresponding to a phrase type;
   pushing a terminal token to the encoder stack;
   popping tokens off the encoder stack to a last pushed non-terminal token, generating a new token using a composition function applied to the popped tokens, and pushing the new token onto the encoder stack; and
   generating non-terminal tokens based on attention to the tokens on the encoder stack, wherein non-terminal tokens are vectorized into a common embedding for different phrase types across encoding time steps without differentiating among the different phrase types; and
   outputting tokens of a target sequence in a second language based on the attention.

14. The method of claim 13, wherein each of the tokens of the source sequence corresponds to a character from the source sequence.

15. The method of claim 13, comprising densely encoding the tokens of the source sequence using real-valued vectors.

16. The method of claim 13, comprising sparsely encoding the tokens of the source sequence using one-hot vectors.

17. The method of claim 13, wherein a phrase tree structure of both the source and target sequences includes one or more character-based token constituents and a phrase type constituent.

18. The method of claim 17, wherein a constant vector is used as the common embedding for different phrase types.

19. The method of claim 17, comprising encoding one or more character-based token constituents, without encoding a phrase type constituent.

20. The method of claim 13, comprising using an ultimate encoder compositional embedding of the source sequence as a decoder embedding for an initially predicted phrase type of the target sequence.

21. The method of claim 13, comprising using policy gradient reinforcement learning to induce unsupervised phrase tree structures of both the source and target sequences.

* * * * *